(12) United States Patent
Allen et al.

(10) Patent No.: US 8,370,440 B2
(45) Date of Patent: Feb. 5, 2013

(54) ROLE-INDEPENDENT CONTEXT EXCHANGE

(75) Inventors: Nicholas Alexander Allen, Redmond, WA (US); Tirunelveli R. Vishwanath, Redmond, WA (US); Stephen J. Millet, Edmonds, WA (US); Edmund Samuel Victor Pinto, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 397 days.

(21) Appl. No.: 12/241,793

(22) Filed: Sep. 30, 2008

(65) Prior Publication Data
US 2010/0082753 A1   Apr. 1, 2010

(51) Int. Cl.
*G06F 15/16* (2006.01)
(52) U.S. Cl. .................. 709/206; 709/246; 715/234
(58) Field of Classification Search .................. None
See application file for complete search history.

(56) References Cited

U.S. PATENT DOCUMENTS

| | | | |
|---|---|---|---|
| 6,769,015 B1* | 7/2004 | Bates et al. | 709/206 |
| 6,791,582 B2* | 9/2004 | Linsey et al. | 715/751 |
| 6,934,948 B2 | 8/2005 | Mikalsen et al. | |
| 7,051,071 B2* | 5/2006 | Stewart et al. | 709/204 |
| 7,051,072 B2* | 5/2006 | Stewart et al. | 709/204 |
| 7,130,884 B2 | 10/2006 | Maehiro | |
| 7,249,195 B2 | 7/2007 | Panec et al. | |
| 7,680,895 B2* | 3/2010 | Perlow et al. | 709/207 |
| 7,720,918 B1* | 5/2010 | Martin et al. | 709/206 |
| 7,756,936 B2* | 7/2010 | Rosenberg et al. | 709/206 |
| 7,970,837 B2* | 6/2011 | Lyle et al. | 709/206 |
| 7,970,848 B2* | 6/2011 | Lin et al. | 709/206 |
| 7,984,104 B1* | 7/2011 | Stark et al. | 709/206 |
| 7,996,237 B2* | 8/2011 | Vedula | 709/206 |
| 2002/0059455 A1 | 5/2002 | Tajiri et al. | |
| 2005/0044042 A1 | 2/2005 | Mendiola et al. | |
| 2005/0050549 A1 | 3/2005 | Joseph et al. | |
| 2006/0155529 A1 | 7/2006 | Ludviksson et al. | |
| 2006/0168110 A1 | 7/2006 | Warrier et al. | |
| 2006/0235983 A1 | 10/2006 | Layman et al. | |
| 2006/0294191 A1 | 12/2006 | Marston et al. | |
| 2007/0067398 A1 | 3/2007 | Karmarkar | |
| 2007/0150546 A1 | 6/2007 | Karakashian et al. | |
| 2007/0162549 A1 | 7/2007 | Jin et al. | |
| 2010/0049813 A1* | 2/2010 | Turakhia | 709/206 |

FOREIGN PATENT DOCUMENTS

JP   2005115830 A   *   4/2005

OTHER PUBLICATIONS

Maybury, Mark. "Collaborative Virtual Environments for Analysis and Decision Support: Creating a productive collaborative environment requires a delicate balance of technology, knowledge, and trust." Communications of the ACM. Dec. 2001. ACM Press. vol. 44, No. 12. 50-54.*

NNRD420121. "Saving E-Mail Documents/Discussion Trends." IBM Research Disclosure. Apr. 1, 1999. UK. vol. 42, Issue 420.*

(Continued)

*Primary Examiner* — Jeffrey R Swearingen
(74) *Attorney, Agent, or Firm* — Microsoft Corporation (57) ABSTRACT

Technologies for conversations between various parties, the conversations including context information that can be persisted to maintain the conversation when the parties or the communications media they communicate over operate intermittently. In such a conversation, any party can embed its view of the context into a message and any party can send the next message regardless of role and regardless of the underlying network, transport, or application message exchange pattern. Such technologies provide for durable services.

20 Claims, 3 Drawing Sheets

OTHER PUBLICATIONS

Ranganathan, Anand et al. "ConChat: A Context-Aware Chat Program." Pervasive Computing. vol. 1, Issue 3. 2002. IEEE. 51-57.*

Satish Thatte, "Message Exchange Protocols for Web Services", Retrieved at <<http://www.w3.org/2001/03/WSWS-popa/paper39>>, W3C Workshop on Web Services, Apr. 11-12, 2001, San Jose, CA, USA, pp. 5.

Rich Salz, "XKMS Messages in Detail", Retrieved at <<http://www.xml.com/pub/a/ws/2004/04/07/salz.html>>, Apr. 7, 2004, pp. 4.

Booth, et al., "Web Services Architecture", Retrieved at <<http://jmvidal.cse.sc.edu/talks/webservicesarch/allslides.xml>>, Apr. 21, 2004, pp. 5.

"Blocks eXtensible eXchange Protocol Framework (BEEP)", Retrieved at http://xml.coverpages.org/beep.html>>, Dec. 6, 2001, pp. 11.

Int. Search Report cited in PCT Application No. PCT/US2009/057044 dated May 7, 2010, 11 pgs.

Int. Preliminary Report on Patentability cited in PCT Application No. PCT/US2009/057044 dated Apr. 5, 2011, 5 pgs.

First Chinese Office Action cited in Chinese Application No. 200980139423.9 dated Mar. 29, 2012, 9 pgs.

Reply to first Chinese Office Action cited in Chinese Application No. 200980139423.9 dated Jun. 14, 2012, 10 pgs.

* cited by examiner

ROLE-INDEPENDENT CONTEXT EXCHANGE

BACKGROUND

The advent of networks, and the Internet in particular, have resulted in on-line services becoming commonplace. Such on-line services are generally accessed via some form of messaging over a network. A sustained exchange of related messages between two parties generally requires that the parties maintain historical information about the conversation (conversation state) and that the parties have a mechanism for identifying messages that may are related.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present examples provide technologies for conversations between various parties, the conversations including context information that can be persisted to maintain the conversation when the parties or the communications media they communicate over operate intermittently. In such a conversation, any party can embed its view of the context into a message and any party can send the next message regardless of role and regardless of the underlying network, transport, or application message exchange pattern. Such technologies provide for durable services.

Many of the attendant features will be more readily appreciated as the same become better understood by reference to the following detailed description considered in connection with the accompanying drawings.

DESCRIPTION OF THE DRAWINGS

The present description will be better understood from the following detailed description considered in connection with the accompanying drawings, wherein.

Like reference numerals are used to designate like parts in the accompanying drawings.

DETAILED DESCRIPTION

The detailed description provided below in connection with the accompanying drawings is intended as a description of the present examples and is not intended to represent the only forms in which the present examples may be constructed or utilized. The description sets forth at least some of the functions of the examples and/or the sequence of steps for constructing and operating examples. However, the same or equivalent functions and sequences may be accomplished by different examples.

Although the present examples are described and illustrated herein as being implemented in a computing and networking environment, the technologies described are provided as examples and not limitations. As those skilled in the art will appreciate, the present examples are suitable for application in a variety of different types of computing and networking environments.

Figure 1:
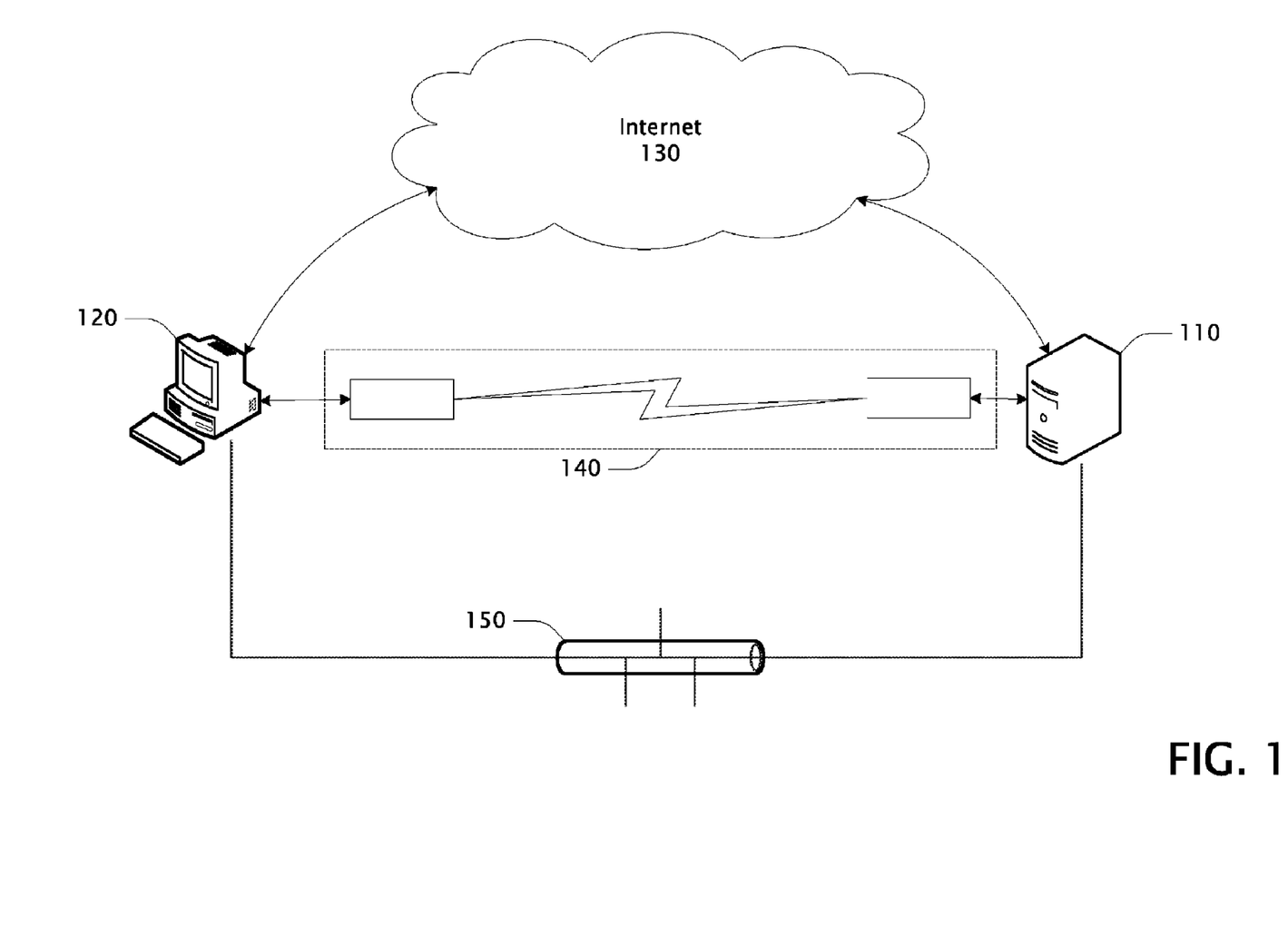
FIG. 1 is block diagram showing example parties communicatively coupled via various communications media.

FIG. 1 is block diagram showing example parties 110 and 120 communicatively coupled via various communications media. Example party 110 is shown coupled to example party 120 via the Internet 130, and via example message queue 140, and via example network 150 which may be a local-area network ("LAN"), a wide-area network ("WAN") or any other kind of network or combination of networks. Parties 110 and/or 120 may additionally or alternatively be communicatively coupled via any other media, technology, means, or the like (collectively and individually referred to herein as "communications media" and including that described in connection with FIG. 3). Parties 110 and/or 120 may include a plurality of network interface cards or the like, each coupled to a different network or the like.

In this example, communications media 130, 140, and 150 are "communicatively distinct" or simply "distinct". That is, each of parties 110 and 120 are coupled to communications media 150 by one coupling (not shown, such as a network interface card ("NIC") or the like), and to communications media 140 by another distinct coupling (not shown), and to communications media 130 by yet another distinct coupling (not shown). Thus party 110 cannot communicate with party 120 via the Internet (communications media 130) over its coupling to communications media 150 because the various communications media are distinct. Such communications media may share hardware, networks, links, etc., yet they are still communicatively distinct or distinct. For example, a virtual private network ("VPN") established over the Internet is typically communicatively distinct from the Internet over which it operates. In another example, a LAN connection to a particular party can be communicatively distinct from a WAN connection or another distinct LAN to the same party. In another example, a message queue may be established on the Internet or on a LAN such that the message queue is distinct from the Internet or the LAN. Many other examples of communicatively distinct communications media are known to those of skill in the art and may be utilized by the present invention.

If two parties in a conversation, such as parties 110 and 120, are guaranteed to operate continuously then a message exchange can be carried out with information that resides in non-persistent memories of the two parties. For example, this may be the case with a series of messages that have been exchanged over the same Transport Control Protocol ("TCP") connection over a LAN. However, it is common for applications to require that one or both of the parties operate intermittently and/or that the communications media coupling them operate intermittently. Further, it may be of value to allow the particular communications media used to exchange messages between parties to change from time to time, even from one message to the next.

The term "party" or "parties" as used herein generally refers to some form of computing system or device or the like capable of communications with another party. A party may also be termed a "system" herein. Such a computing system may be provided by a computing environment such as that described in connection with FIG. 3. A party may be considered a client and/or a server and/or a service. A party may be a "durable service", a service that persists conversation state such that the service can be shut down and restarted without loss of conversation state. A party may be comprised of a collection of computing systems coupled via networks, buses, or other communications means, or the like.

The terms "conversation message" and "message" as used herein generally refer to a self-contained unit of data that may comprise several parts, typically including a body and one or more headers. Such a message may be transported in one or more data packets which may be sent to another party using any suitable transport protocol. The term "conversation" as used herein typically refers to some exchange of messages between parties, and each sent message may involve simple or complex packet exchanges between parties via a transport protocol such as, for example, Hypertext Transport Protocol ("HTTP") or SOAP (previously known as "Simple Object Access Protocol"). A conversation may be short in duration or go on for a very long duration, such as months or years or even longer. A conversation may be comprised of just a few messages (e.g., a single request followed by a single reply) or many messages. A conversation may utilize a plurality of communications media and such media may vary over the life of the conversation. A conversation may persist even when the parties, communications media, transports, and/or the like involved cease operation for a time and later become operational again, either accidentally or intentionally. A conversation may be initiated by any party regardless of any role or roles assigned to a party. Any party may be involved in one or more conversations simultaneously.

The term "communications media" as used herein generally refers to physical connectivity and/or protocol connectivity and any combination of the two or the like. Examples of physical connectivity communications media include a particular network, serial bus, infrared link, and the like. Examples of a protocol connectivity communications media various transport protocols over some physical connectivity, such as a message queue, TCP, Simple Mail Transfer Protocol ("SMTP"), SOAP (previously known as "Simple Object Access Protocol"), or HTTP. Protocol connectivity may provide for direct connections (e.g., TCP) or decoupled connections (e.g., a message queue). In some cases different transport protocols may make use of the same physical connectivity. For example, a message queue and a TCP connection may both operate over the same network. Further, in another example, a message queue may be implemented using TCP.

Each conversation message typically has associated with it, included and/or referenced, conversation context that represents the state of the conversation, an address for the sending conversation party, and an address for the receiving conversation party. The format of a message may be arbitrarily structured. In one example, messages are formatted using Extensible Markup Language ("XML") with sections for the addresses and the context. In another example, the context of a conversation in a message is a list of context properties that each have a given name and a corresponding value that are text strings. In another example, the context and/or addresses are added to message headers. In yet another example, the context and/or addresses are inferred from the contents of the message body using a prearranged agreement between the two parties of a conversation.

Figure 2:
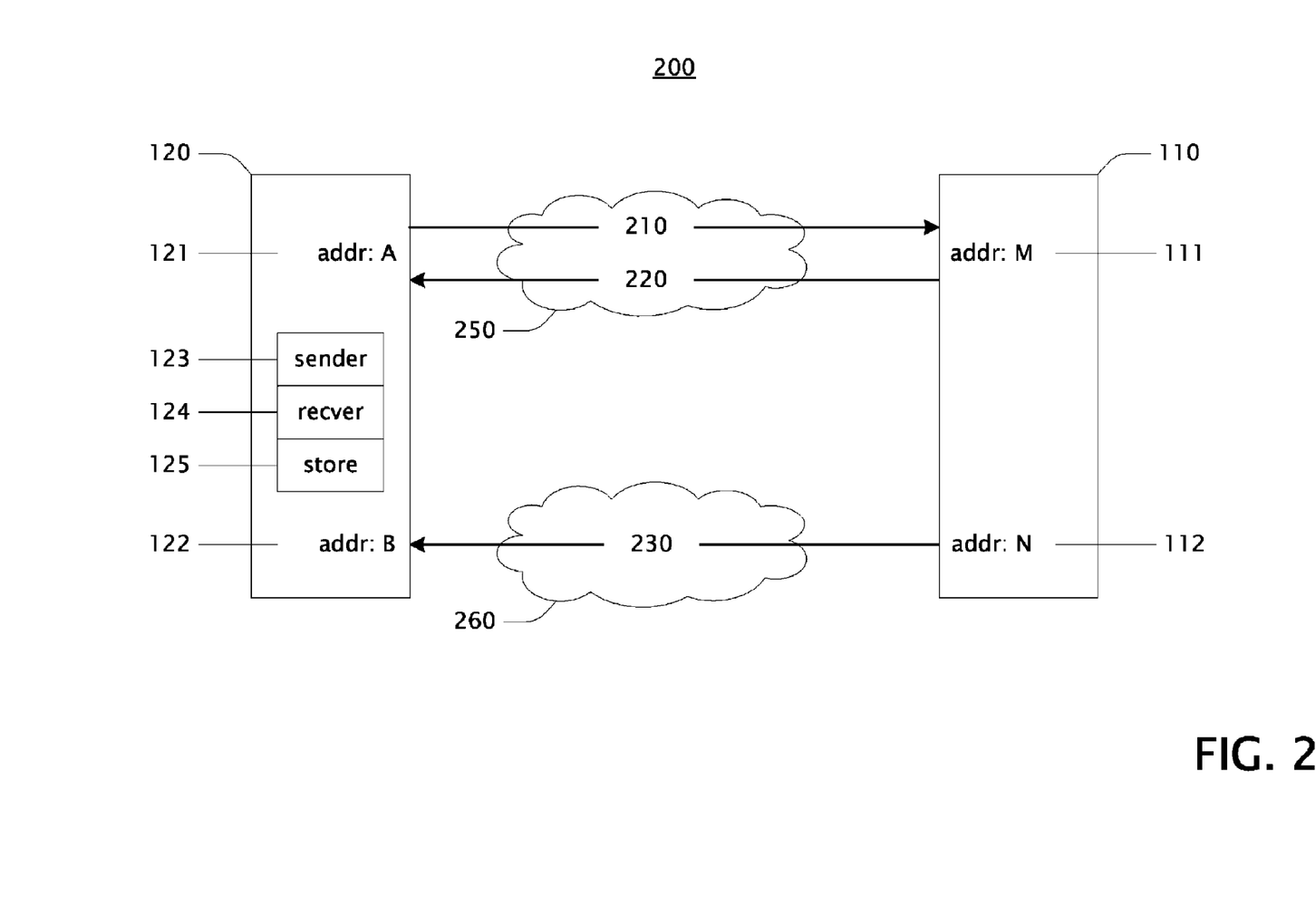
FIG. 2 is a block diagram showing example parties and an example message sequence of an example conversation.

FIG. 2 is a block diagram showing example parties 110 and 120 and an example message sequence 200 of an example conversation. Parties 110 and 120 are similar to those of FIG. 1. Example Party 120 is shown including an example sender 123, an example receiver 124, and an example store 125. Sender 123 typically includes a message processing pipeline for generating and sending messages. Receiver 124 typically includes a message processing pipeline for receiving and processing messages. Store 125 typically includes a non-volatile storage mechanism for storing message context and the like. Party 110 and other parties that may be involved in conversations typically include similar compatible senders, receivers, and stores.

FIG. 2 shows example party 110 coupled via an interface at address M 111 and communications media 250 to example party 120 via an interface at address A 121. Example party 110 is further shown coupled to example party 120 via another interface at address N 112 and communications media 260 to example party 120 via another interface at address B 122. Communications media 250 and 260 are communicatively distinct from each other. That is, for example, party 110 cannot communicate from address M 111 to party 120 at address B 122 because there is no communications media providing a communications path between the address M 111 and address B 122. In other words, party 110 cannot communicate with party 120 at address B 122 over communications media 250. Accordingly, an address may be considered "non-reachable" or "not reachable". Such a term, as used herein, typically refers to an address to which a message cannot be specifically directed. In some cases, an address may be non-reachable from a particular sending address due to network topology or the like, as described herein above with respect to two communications media being communicatively distinct or the like. Other examples of non-reachable address include the <none> address or the like typically indicating that no address is being provided, as well as an <anonymous> address typically indicating a party that can receive messages but for which a usable address cannot be calculated or resolved. Examples of anonymous addresses include the reverse connections of HTTP and TCP connections.

FIG. 2 also shows an example communications sequence in steps 210, 220, and 230. In this example, step 210 typically indicates a message—Conversation Message A—being sent from party 120 over communications media 250 to party 110. In this example, the conversation message includes the following information:

---
From: Party 120 (at Address A 121)
To: Party 110 (at Address M 111)
Application Operation: Do Work W
Application Reply To: Party 120 at Address A 121
Context: Work Order #123
Conversation Reply To: Party 120 at Address B 122

---

Example Conversation Message A

The "From" field typically indicates an address of the party that the message is being sent from, or party 120 in this example. The "To" field typically indicates an address of the party that the message is being sent to, or party 110 in this example. The format of an address may be any suitable format including a universal resource locator ("URL"), internet protocol ("IP") address, email address, or the like.

The "Application Operation" field typically indicates a request for some application operation that the sending party is requesting be performed by the receiving party, or "Do Work W" in this example. The information in this field typically identifies the desired operation and/or may include any other information, typically related to the operation. The "Application Reply To" field typically indicates an address of the party to which an application can send a response to the application operation request, or party 120 at address 121 in this example. This address may be for any party including the requesting party, party 120 at address A 121 in this example, or the address may be an alternate address for the requesting party. The address may be formatted as described herein above or in any other suitable format. In one example, the "Application Operation" field and the "Application Reply To" field and the like are included in the message body. Other fields related to application operations may additionally be included in a message.

The "Context" field typically includes conversation context information such as that described in connection with FIG. 1. In this example, the context includes "Work Order #123" identifying that work that sending party 120 is requesting receiving party 110 to perform. In one example, the context may include an identifier that the receiving party is already aware of. In another example, the context may include an identifier that the receiving party is not already aware of. In this case the receiving party associates the context and identifier with an instance it creates for the conversation. Such an instance may be any resource, object, process, workflow, service, or the like suitable to the identifier. The "Conversation Reply To" field typically indicates an address of the party to which the next message in the conversation may be sent, or party 120 at address B 122 in this example. This address may be for any party including the requesting party, or the address may be an alternate address for the requesting party, or party 120 at address B 122 in this example. The address may be formatted as described herein above. In particular, the "Conversation Reply To" field of the conversation message may indicate an address that cannot be reached via the same communications media used to receive the conversation message. In this case, a conversation reply is sent using any suitable communications media. In one example, the "Context" field and the "Conversation Reply To" field are included in the conversation context portion of a message. Other fields related to conversation context may additionally be included in a message.

In one example, this message may be formatted in XML as described herein above. Following is a hypothetical XML example of Conversation Message A:

---

```
<soap:Envelope xmlns:soap="http://www.w3.org/2003/05/soap-envelope"
xmlns:wsa="http://www.w3.org/2005/08/addressing">
  <soap:Header>
    <wsa:From>
      <wsa:Address>Party 120 (at Address A 121)</wsa:Address>
    </wsa:From>
    <wsa:To>Party 110 (at Address M 111)</wsa:To>
    <wsa:ReplyTo>
      <wsa:Address>Party 120 (at Address A 121)</wsa:Address>
    </wsa:ReplyTo>
    <wsa:Action>Do Work W</wsa:Action>
    <wsc:CallbackContext
xmlns:wsc="http://schemas.microsoft.com/ws/2008/02/context">
      <wsc:CallbackEndpointReference>
        <wsa:Address>Party 120 (at Address B 122)</wsa:Address>
        <wsc:Context>
          <wsc:Property name="Work Order
          Number">123</wsc:Property>
        </wsc:Context>
      </wsc:CallbackEndpointReference>
    </wsc:CallbackContext>
  </soap:Header>
  <soap:Body>
    <!-- Application content -->
  </soap:Body>
</soap:Envelope>
```

---

Step 220 of FIG. 2 typically indicates an application reply—Application Reply G—being sent from party 110 over communications media 250 to party 120. Such a reply typically takes place at the application level and is generally not a part of the conversation. Such a reply typically indicates that party 110 received the request; but such a reply does not typically indicate that the requested operation is or ever will be performed, only that the request was received. It may take some time, even days, months, years, or longer, for the requested operation to be completed. In this example, the application reply includes the following information:

---

From: Party 110 (at Address M 111)
To: Party 120 (at Address A 121)
Application Operation: Request Received
Application Reply To: <none>

---

Example Application Reply G

In one example, this reply may be formatted in XML as described herein above. The "From" field typically indicates an address of the party that the reply is being sent from, or party 110 in this example. The "To" field typically indicates an address of the party that the reply is being sent to, or party 120 in this example. The format of an address may be any suitable format including a universal resource locator ("URL"), internet protocol ("IP") address, email address, or the like.

The "Application Operation" field typically indicates a request for some application operation that the sending party is requesting be performed by the receiving party, or "Request Received" in this example indicating that the previously sent request was received. The information in this field typically identifies the desired operation and may include any other information, typically related to the operation. The "Application Reply To" field typically indicates an address of the party to which an application can send a response to the application operation request, or "<none>" in this example indicating that no reply is necessary. Other fields related to application operations may additionally or alternatively be included in a reply.

In one example, this reply may be formatted in XML as described herein above. Following is a hypothetical XML example of Application Reply G:

---

```
<soap:Envelope xmlns:soap="http://www.w3.org/2003/05/soap-envelope"
xmlns:wsa="http://www.w3.org/2005/08/addressing">
  <soap:Header>
    <wsa:From>
      <wsa:Address>Party 110 (at Address M 111)</wsa:Address>
    </wsa:From>
    <wsa:To>Party 120 (at Address A 121)</wsa:To>
    <wsa:ReplyTo>
<wsa:Address>http://www.w3.org/2005/08/addressing/
none</wsa:Address>
    </wsa:ReplyTo>
    <wsa:Action>Request Received</wsa:Action>
  </soap:Header>
  <soap:Body>
    <!-- Application content -->
  </soap:Body>
</soap:Envelope>
```

---

Step 230 of FIG. 2 typically indicates a message—Conversation Message B—being sent from party 110 over communications media 260 to party 120. In the example, this message is part of the conversation started with Conversation Message A. Note that this message is sent over a different communications media, media 260, than the previous message of the conversation. In this example, the conversation message includes the following information:

```
From: Party 110 (at Address N 112)
To: Party 120 (at Address B 122)
Application Operation: Completed Do Work W
Application Reply To:   <none>
Context: Work Order #123
Conversation Reply To: <none>
```

Example Conversation Message B

In one example, this message may be formatted in XML as described herein above. The "From" field typically indicates an address of the party that the message is being sent from, or party 110 in this example. The "To" field typically indicates an address of the party that the message is being sent to, or party 120 in this example. The format of an address may be any suitable format including a universal resource locator ("URL"), internet protocol ("IP") address, email address, or the like.

The "Application Operation" field typically indicates a request for some application operation that the sending party is requesting be performed by the receiving party, or "Completed Do Work W" in this example indicating a status of a previously requested operation. The information in this field typically identifies the desired operation and/or may include any other information, typically related to the operation. The "Application Reply To" field typically indicates an address of the party to which an application can send a response to the application operation request, or "<none>" in this example indicating that no reply is necessary. This address may be for any party including the requesting party, party 110 at address N 112 in this example, or the address may be an alternate address for the requesting party. The address may be formatted as described herein above or in any other suitable format. In one example, the "Application Operation" field and the "Application Reply To" field and the like are included in the message body. Other fields related to application operations may additionally be included in a message.

The "Context" field typically includes conversation context information such as that described in connection with FIG. 1. In this example, the context includes "Work Order #123" identifying that work that sending party 120 is requesting receiving party 110 to perform. Note that the context of Conversation Message B is the same as that of Conversation Message A indicating that both messages are a part of the same conversation. The "Conversation Reply To" field typically indicates an address of the party to which the next message in the conversation may be sent, including "<none>" in this example indicating that no additional message is expected responsive to this message.

In the example case of party 120 sending Conversation Message A to party 110, party 120 initiated a new conversation regarding a work order, Work Order #123 in particular. Message A was sent over communications media 250, say for example using an HTTP connection with party 110. The message requested that party 110 do some work, Work W in particular. An application-level reply was sent back indicating that the request was received. The HTTP connection may have subsequently been terminated and either or both parties, as well as the communications media to which they were coupled, may have been rebooted or the like. Later, party 110 initiated further communications with party 120 by sending a message—Conversation Message B—that is part of the same conversation regarding Work Order #123. Message B was sent over communications media 260, say for example using a message queue, different than that over which Conversation Message A was sent. Additional messages for the same and/or different conversations may also be sent between parties 110 and 120 as well as any other parties; full duplex communications are supported. Conversations and their message exchange patterns are not tied to any specific underlying network, transport, and/or application message exchange patterns. The context of a conversation can be arbitrarily formatted and augmented by parties of the conversation as it is on-going. Any party can be designated as the next party to send a message to in a conversation. Conversation context and addresses are generally included in a message in a manner that is independent of application information, transport protocols, and network topologies.

In one example, this message may be formatted in XML as described herein above. Following is a hypothetical XML example of Conversation Message B:

```
<soap:Envelope xmlns:soap="http://www.w3.org/2003/05/soap-envelope"
xmlns:wsa="http://www.w3.org/2005/08/addressing">
   <soap:Header>
      <wsa:From>
         <wsa:Address>Party 110 (at Address N 112)</wsa:Address>
      </wsa:From>
      <wsa:To>Party 120 (at Address B 122)</wsa:To>
      <wsa:ReplyTo>
<wsa:Address>http://www.w3.org/2005/08/addressing/
none</wsa:Address>
      </wsa:ReplyTo>
      <wsa:Action>Completed Do Work W</wsa:Action>
      <wsc:Context
xmlns:wsc="http://schemas.microsoft.com/ws/2008/02/context">
         <wsc:Property name="Work Order Number">123</wsc:Property>
      </wsc:Context>
   </soap:Header>
   <soap:Body>
      <!-- Application content -->
   </soap:Body>
</soap:Envelope>
```

In one example of how messages can be applied to real-world scenarios, consider two parties involved in a banking money transfer. In this example, party 120 starts a conversation by sending a message (similar to Conversation Message A) to party 110 over communications media 250 (e.g., using an HTTP connection over the Internet), the message including an Application Operation of "Transfer Money", an Application Reply address on communications media 250 (e.g., using the same HTTP connection as the original message), and a context including a specific "Order Number" and a Conversation Reply address on communications media 260 (e.g., using a message queue over a secure private network) at which party 120 can be reached with future updates about the requested money transfer. Party 120 stores the context of the message that is sent in a local store, such as store 125.

Party 110 receives the money transfer request message and responds by sending a reply (similar to Application Reply G) to the Application Reply address in the message so that party 120 knows that the request was received by party 110. Party 110 is not promising at this point that the money transfer has or ever will actually take place. It may take several hours, days, weeks, or the like to validate the request and complete the transfer.

At some later point in time, party 110 continues the conversation by sending a new message (similar to Conversation message B) to party 120 over communications media 260—the message queue over a secure private network—indicating a status of the money transfer. Such status messages could indicate such things as "processing", "transfer failed", "transfer succeeded", etc. Each such status message includes the context originally provided by party 120. Such status messages are not described by the message exchange pattern of the original message. Such status messages may not be supported by the original communications media, such as media 250.

In such a conversation, any party can embed its view of the context into a message. Another party may examine this context in a message to determine if the context begins a new conversation, continues an existing conversation, or modifies the context of an existing conversation. Further, any party in a conversation can send the next message regardless of the underlying network, transport, or application message exchange pattern.

The fields illustrated in the XML examples herein above are provided as examples and not as limitations. The fields shown need not be included in such a message and other fields may alternatively and/or additionally be included. Further, a field included in such a message may not necessitate a corresponding action by a receiver of the message. Also, a field may be excluded from a message if it is already understood by the transmitting and receiving parties. For example, the Application Reply To field may be omitted if the corresponding request does not necessitate a reply.

Following is another example that may further contrast the application and conversation contracts. In this example, party 110 operates a Work Order Processing Service with one or more service endpoints that include the service endpoint listening at Address M 111. The Work Order Processing Service has an application contract that includes an application operation "Do Work W". The Work Order Processing Service may include additional application operations as well. There is a means to retrieve metadata that describes the Work Order Processing Service application contract. This metadata typically includes a description for a "Do Work W" request message and a "Do Work W" response message that specifies the structure and allowable content for these messages. The metadata typically indicates that sending a "Do Work W" request message over a communication medium with specified properties and Address M 111 will result in a "Do Work W" response message being sent.

Further, in this example, party 120 operates a Work Order Notification Service with one or more service endpoints that include the service endpoint listening at Address B 122. The Work Order Notification Service has an application contract that includes an application operation "Completed Do Work W". The Work Order Notification Service may include additional application operations as well. There is a means to retrieve metadata that describes the Work Order Notification Service application contract. This metadata typically includes a description for a "Completed Do Work W" request message that specifies the structure and allowable content for this message. The metadata typically indicates that sending a "Completed Do Work W" request message over a communication medium with specified properties and Address B 122 is allowed but no response message will be sent.

Further, in this example, the application contracts for Work Order Processing Service and Work Order Notification Service may be supplemented by a conversation contract that describes a higher-level coordination pattern between the two services. The conversation contract may be described in a computer understandable fashion, in natural language documents, or may simply be a shared understanding among programmers authoring applications that use the two services. The conversation contract may describe additional associations between the two services not found in their respective application contracts. For example, the conversation contract may specify that sometime following receiving a "Do Work W" request message, Party 110 will invoke a "Completed Do Work W" application operation on a service provided by the party that sent the "Do Work W" request message. It may be unspecified when the invocation of "Completed Do Work W" may occur. Thus it may fall before, after, or simultaneously with the "Do Work W" response message. There may be a limitless number of possible conversations between the involved parties and a decision about the next conversation message may involve business logic, other application operations unrelated to the invoked application operation, or other means of informing the decision.

In another example, an address of a service endpoint may include logical information as well as physical information. For example, the physical address of the Work Order Notification Service may be the Address B 122 required for transmission along the appropriate communication medium. The logical address of the Work Order Notification Service may simply be the name "Work Order Notification Service" or the like. The Conversation Reply To address may include one or more physical addresses sufficient for transmitting the next conversation message. Alternatively or additionally, the Conversation Reply To address may lack some portion of the physical address information but include one or more logical addresses from which the lacking physical address information can be calculated. A service may be able to calculate an appropriate physical address and communication medium configuration from the provided logical and physical information. These calculations may make use of information known to the service, may require the service to consult an external directory service, or may require the service to execute one or more discovery protocols to resolve the physical address. Once the physical address for the next conversation message is known the service may need to determine an appropriate communication medium configuration for transmitting to that address.

Figure 3:
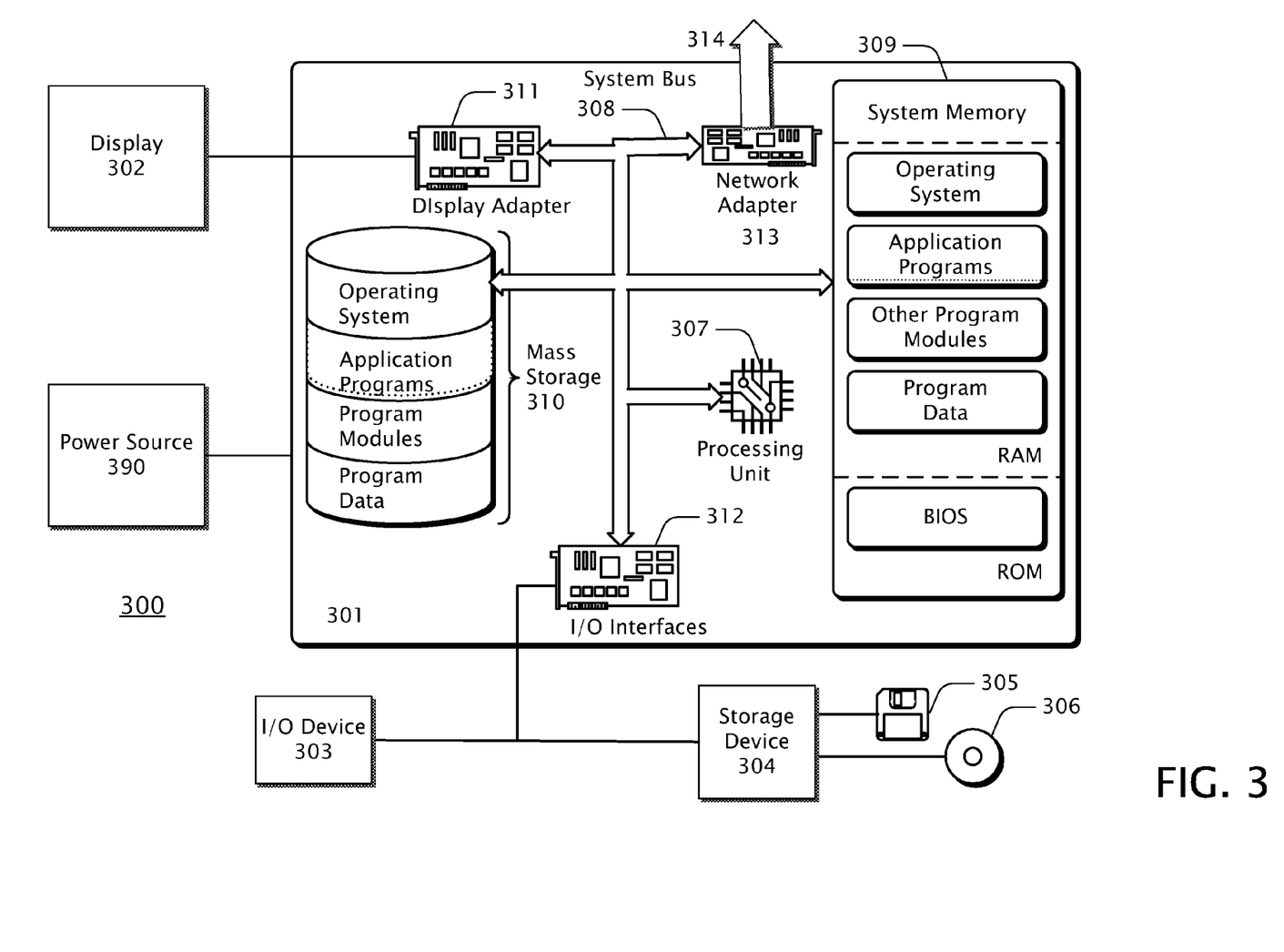
FIG. 3 is a block diagram showing an example computing environment in which the technologies described herein may be implemented.

FIG. 3 is a block diagram showing an example computing environment 300 in which the technologies described herein may be implemented. A suitable computing environment may be implemented with numerous general purpose or special purpose systems. Examples of well known systems may include, but are not limited to, cell phones, personal digital assistants ("PDA"), personal computers ("PC"), hand-held or laptop devices, microprocessor-based systems, multiprocessor systems, servers, workstations, consumer electronic devices, set-top boxes, and the like.

Computing environment 300 typically includes a general-purpose computing system in the form of a computing device 301 coupled to various components, such as peripheral devices 302, 303, 304 and the like. System 300 may couple to various other components, such as input devices 303, including voice recognition, touch pads, buttons, keyboards and/or pointing devices, such as a mouse or trackball, via one or more input/output ("I/O") interfaces 312. The components of computing device 301 may include one or more processors (including central processing units ("CPU"), graphics processing units ("GPU"), microprocessors ("μP"), and the like) 307, system memory 309, and a system bus 308 that typically couples the various components. Processor 307 typically processes or executes various computer-executable instructions to control the operation of computing device 301 and to communicate with other electronic and/or computing devices, systems or environment (not shown) via various communications connections such as a network connection 314 or the like. System bus 308 represents any number of several types of bus structures, including a memory bus or memory controller, a peripheral bus, a serial bus, an accelerated graphics port, a processor or local bus using any of a variety of bus architectures, and the like.

System memory 309 may include computer readable media in the form of volatile memory, such as random access memory ("RAM"), and/or non-volatile memory, such as read only memory ("ROM") or flash memory ("FLASH"). A basic input/output system ("BIOS") may be stored in non-volatile or the like. System memory 309 typically stores data, computer-executable instructions and/or program modules comprising computer-executable instructions that are immediately accessible to and/or presently operated on by one or more of the processors 307.

Mass storage devices 304 and 310 may be coupled to computing device 301 or incorporated into computing device 301 via coupling to the system bus. Such mass storage devices 304 and 310 may include non-volatile RAM, a magnetic disk drive which reads from and/or writes to a removable, non-volatile magnetic disk (e.g., a "floppy disk") 305, and/or an optical disk drive that reads from and/or writes to a non-volatile optical disk such as a CD ROM, DVD ROM 306. Alternatively, a mass storage device, such as hard disk 310, may include non-removable storage medium. Other mass storage devices may include memory cards, memory sticks, tape storage devices, and the like.

Any number of computer programs, files, data structures, and the like may be stored in mass storage 310, other storage devices 304, 305, 306 and system memory 309 (typically limited by available space) including, by way of example and not limitation, operating systems, application programs, data files, directory structures, computer-executable instructions, and the like.

Output components or devices, such as display device 302, may be coupled to computing device 301, typically via an interface such as a display adapter 311. Output device 302 may be a liquid crystal display ("LCD"). Other example output devices may include printers, audio outputs, voice outputs, cathode ray tube ("CRT") displays, tactile devices or other sensory output mechanisms, or the like. Output devices may enable computing device 301 to interact with human operators or other machines, systems, computing environments, or the like. A user may interface with computing environment 300 via any number of different I/O devices 303 such as a touch pad, buttons, keyboard, mouse, joystick, game pad, data port, and the like. These and other I/O devices may be coupled to processor 307 via I/O interfaces 312 which may be coupled to system bus 308, and/or may be coupled by other interfaces and bus structures, such as a parallel port, game port, universal serial bus ("USB"), fire wire, infrared ("IR") port, and the like.

Computing device 301 may operate in a networked environment via communications connections to one or more remote computing devices through one or more cellular networks, wireless networks, local area networks ("LAN"), wide area networks ("WAN"), storage area networks ("SAN"), the Internet, radio links, optical links and the like. Computing device 301 may be coupled to a network via network adapter 313 or the like, or, alternatively, via a modem, digital subscriber line ("DSL") link, integrated services digital network ("ISDN") link, Internet link, wireless link, or the like.

Communications connection 314, such as a network connection, typically provides a coupling to communications media, such as a network. Communications media typically provide computer-readable and computer-executable instructions, data structures, files, program modules and other data using a modulated data signal, such as a carrier wave or other transport mechanism. The term "modulated data signal" typically means a signal that has one or more of its characteristics set or changed in such a manner as to encode information in the signal. By way of example, and not limitation, communications media may include wired media, such as a wired network or direct-wired connection or the like, and wireless media, such as acoustic, radio frequency, infrared, or other wireless communications mechanisms.

Power source 390, such as a battery or a power supply, typically provides power for portions or all of computing environment 300. In the case of the computing environment 300 being a mobile device or portable device or the like, power source 390 may be a battery. Alternatively, in the case computing environment 300 is a desktop computer or server or the like, power source 390 may be a power supply designed to connect to an alternating current ("AC") source, such as via a wall outlet.

Some mobile devices may not include many of the components described in connection with FIG. 3. For example, an electronic badge may be comprised of a coil of wire along with a simple processing unit 307 or the like, the coil configured to act as power source 390 when in proximity to a card reader device or the like. Such a coil may also be configure to act as an antenna coupled to the processing unit 307 or the like, the coil antenna capable of providing a form of communication between the electronic badge and the card reader device. Such communication may not involve networking, but may alternatively be general or special purpose communications via telemetry, point-to-point, RF, IR, audio, or other means. An electronic card may not include display 302, I/O device 303, or many of the other components described in connection with FIG. 3. Other mobile devices that may not include many of the components described in connection with FIG. 3, by way of example and not limitation, include electronic bracelets, electronic tags, implantable devices, and the like.

Those skilled in the art will realize that storage devices utilized to provide computer-readable and computer-executable instructions and data can be distributed over a network. For example, a remote computer or storage device may store computer-readable and computer-executable instructions in the form of software applications and data. A local computer may access the remote computer or storage device via the network and download part or all of a software application or data and may execute any computer-executable instructions. Alternatively, the local computer may download pieces of the software or data as needed, or distributively process the software by executing some of the instructions at the local computer and some at remote computers and/or devices.

Those skilled in the art will also realize that, by utilizing conventional techniques, all or portions of the software's computer-executable instructions may be carried out by a dedicated electronic circuit such as a digital signal processor ("DSP"), programmable logic array ("PLA"), discrete circuits, and the like. The term "electronic apparatus" may include computing devices or consumer electronic devices comprising any software, firmware or the like, or electronic devices or circuits comprising no software, firmware or the like.

The term "firmware" typically refers to executable instructions, code, data, applications, programs, or the like maintained in an electronic device such as a ROM. The term "software" generally refers to executable instructions, code, data, applications, programs, or the like maintained in or on any form of computer-readable media. The term "computer-readable media" typically refers to system memory, storage devices and their associated media, and the like.

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

The invention claimed is:

1. A method of sending a message of a communication, the method comprising:
    sending the message to an other party via a direct connection via a first communications media, the sent message comprising:
        a communication context of the sent message;
        an application operation that is:
            associated with the communication context; and
            indicative of an action comprising identified work that the other party is requested to perform; and
        a communication reply address that is:
            reachable via a decoupled connection;
            not reachable via the first communications media; and
            usable by the other party to reply to the sent message received by the other party.

2. The method of claim 1, the communication context determined based at least in part on at least some of a body of the message.

3. The method of claim 1, comprising storing a communication state comprising the communication context and the communication reply address, the stored communication state sufficient to maintain the communication through a shutdown and restart of a system.

4. The method of claim 1, the sent message comprising an application reply address, the application reply address different than the communication reply address, an application reply sent via the first communications media to the application reply address not comprised in the communication.

5. The method of claim 4, the application reply address not a reachable address.

6. The method of claim 4, the application reply address reachable via the first communications media.

7. The method of claim 1, the communication reply address comprising at least one of a universal resource locator, an internet protocol address, or an email address.

8. The method of claim 1, the communication reply address comprising a logical address lacking some portion of physical address information needed to send a communication message, the lacking physical address information obtainable from an external service.

9. The method of claim 1, at least one of the direct connection comprising a transmission control protocol (TCP) connection or the decoupled connection comprising a message queue.

10. The method of claim 1, the communication context determined based at least in part on at least some of a body of the message using a prearranged agreement between a party implementing the method and the other party.

11. The method of claim 1, a destination address associated with the other party comprising at least one of a universal resource locator (URL) or an email address.

12. A computer-readable storage device comprising computer-executable instructions that, when executed by a processor, perform a method of sending a message of a communication, the method comprising:
    sending the message to an other party via a direct connection via a first communications media, the sent message comprising:
        a communication context of the sent message;
        an application operation that is:
            associated with the communication context; and
            indicative of an action comprising identified work that the other party is requested to perform; and
        a communication reply address that is:
            reachable via a decoupled connection;
            not reachable via the first communications media; and
            usable by the other party to reply to the sent message received by the other party.

13. The computer-readable storage device of claim 12, the communication reply address comprising a logical address lacking some portion of physical address information needed to send a communication message, the lacking physical address information obtainable from an external service.

14. The computer-readable storage device of claim 12, the sent message comprising an application reply address, the application reply address reachable via the first communications media.

15. The computer-readable storage device of claim 12, the decoupled connection comprising a message queue.

16. The computer-readable storage device of claim 12, the direct connection comprising a transmission control protocol (TCP) connection.

17. The computer-readable storage device of claim 12, the communication context determined based at least in part on at least some of a body of the message using a prearranged agreement between a party implementing the method and the other party.

18. The computer-readable storage device of claim 12, at least one of a destination address associated with the other party comprising an internet protocol (IP) address or the communication reply address comprising an email address.

19. A system comprising:
    one or more processors; and
    a memory comprising computer-executable instructions that, when executed by at least some of the one or more processors, perform a method of sending a message of a communication, the method comprising:
        sending the message to an other party via a direct connection via a first communications media, the sent message comprising:
            a communication context of the sent message;
            an application operation that is:
                associated with the communication context; and
                indicative of an action comprising identified work that the other party is requested to perform; and
            a communication reply address that is:
                reachable via a decoupled connection;
                not reachable via the first communications media; and
                usable by the other party to reply to the sent message received by the other party.

20. The system of claim 19, the application operation comprising an indication of a status of a previously requested operation.

* * * * *